N. WHITE.
ADDING AND LISTING MACHINE.
APPLICATION FILED MAR. 5, 1910.
1,048,249.
Patented Dec. 24, 1912.
9 SHEETS—SHEET 1.
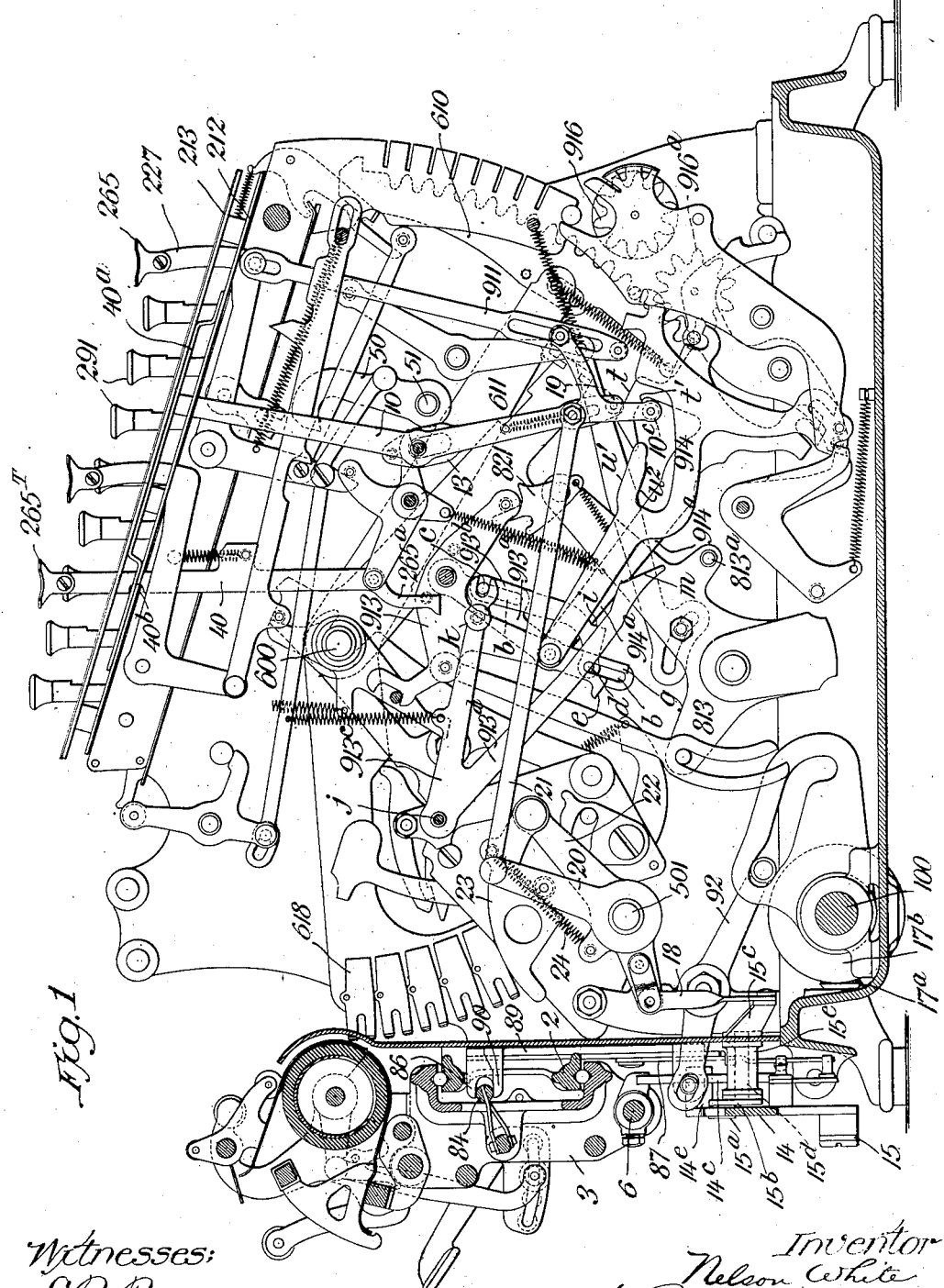

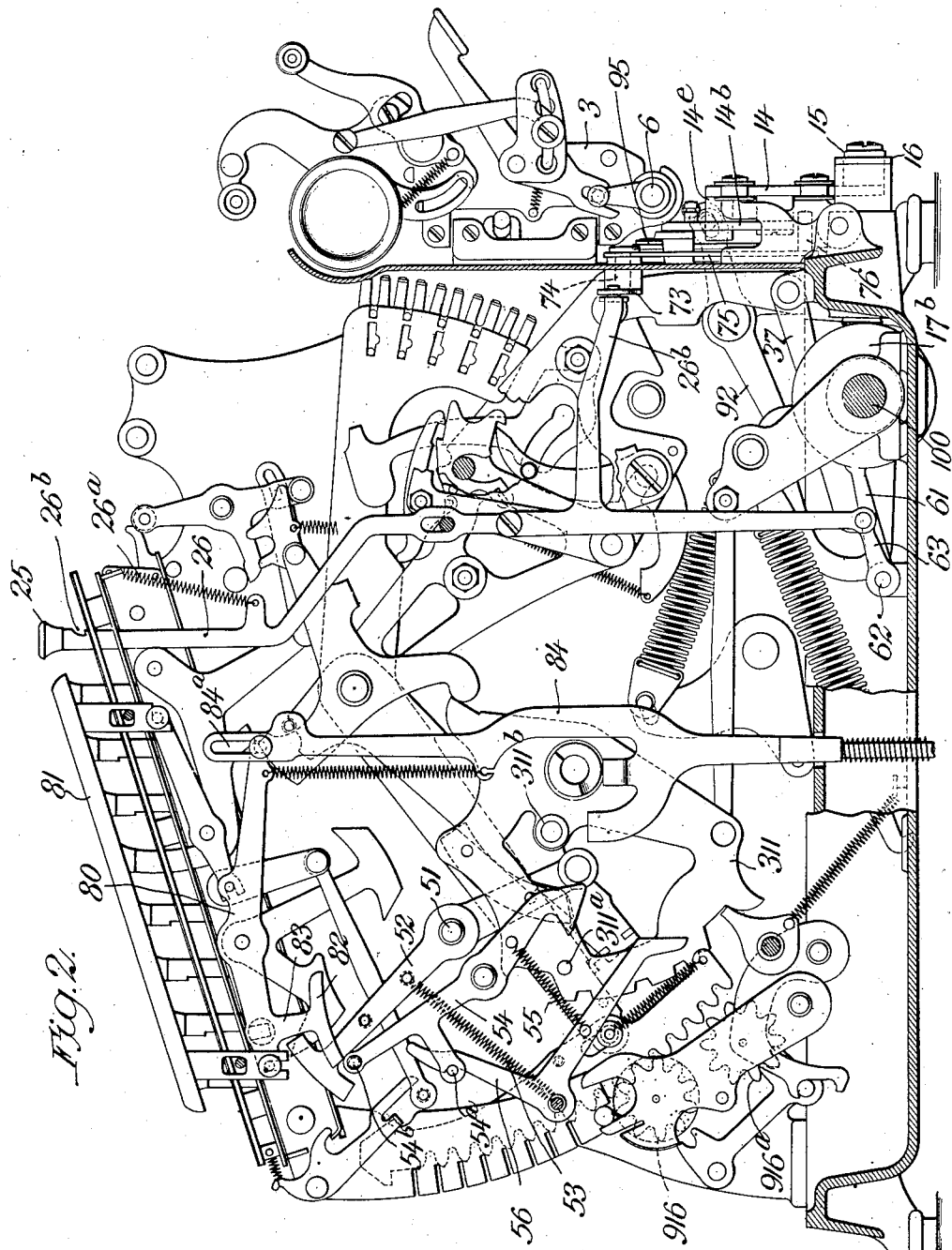

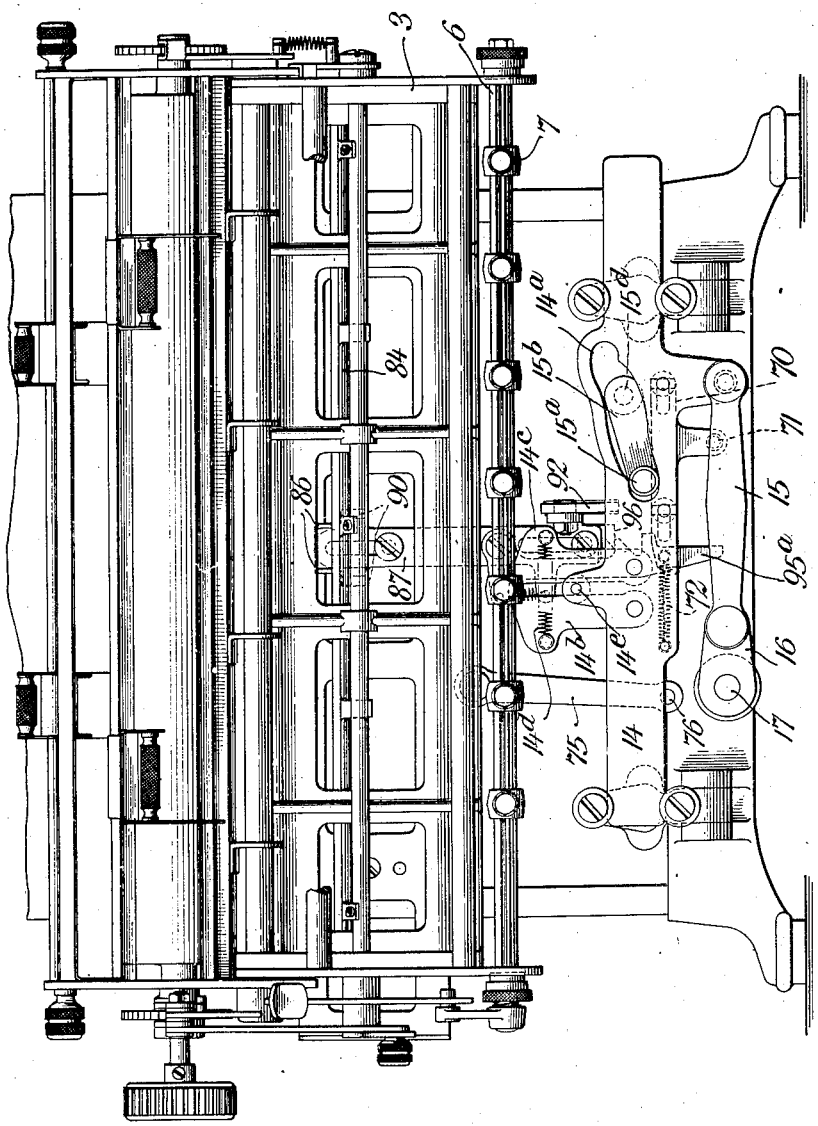

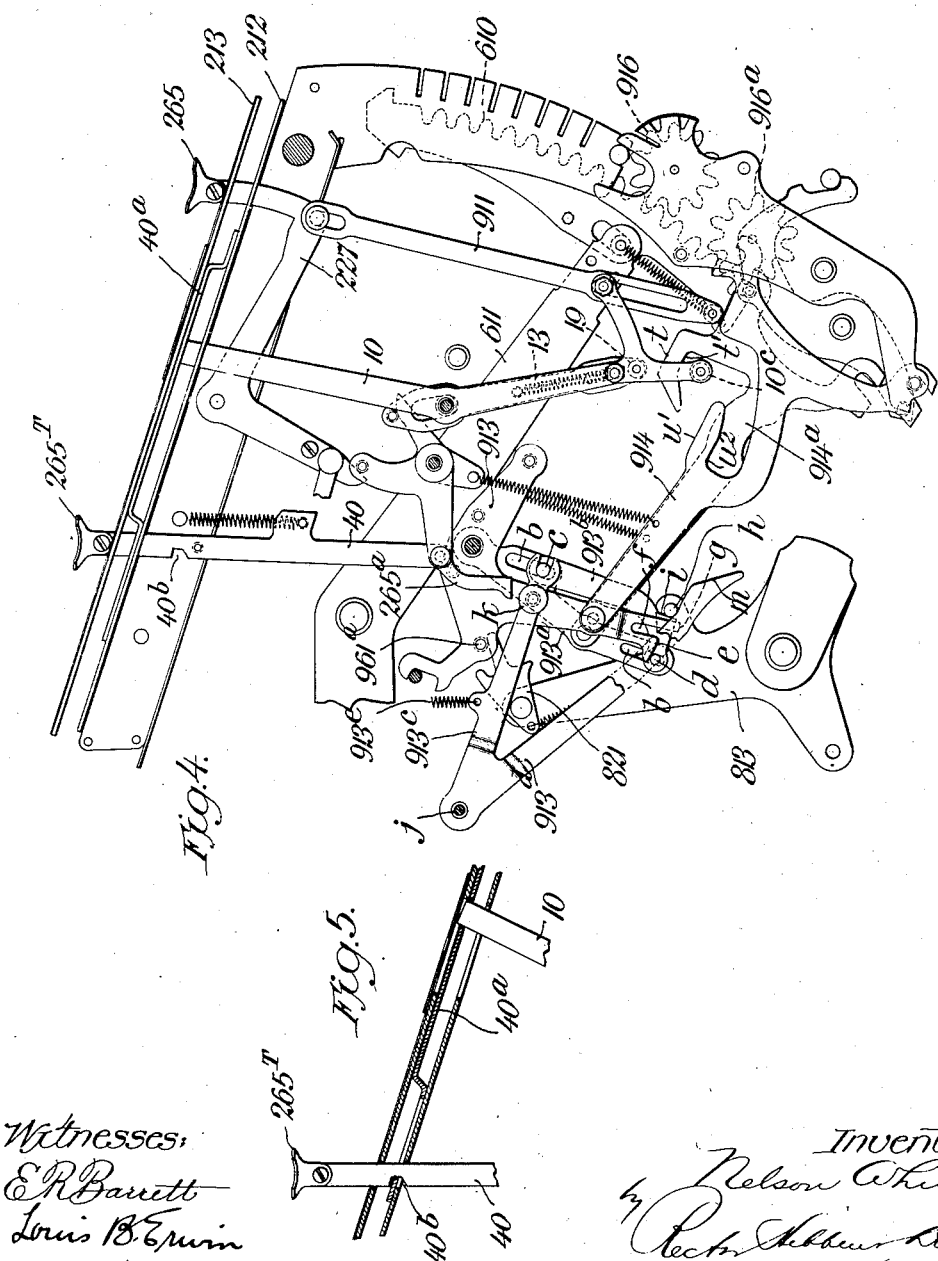

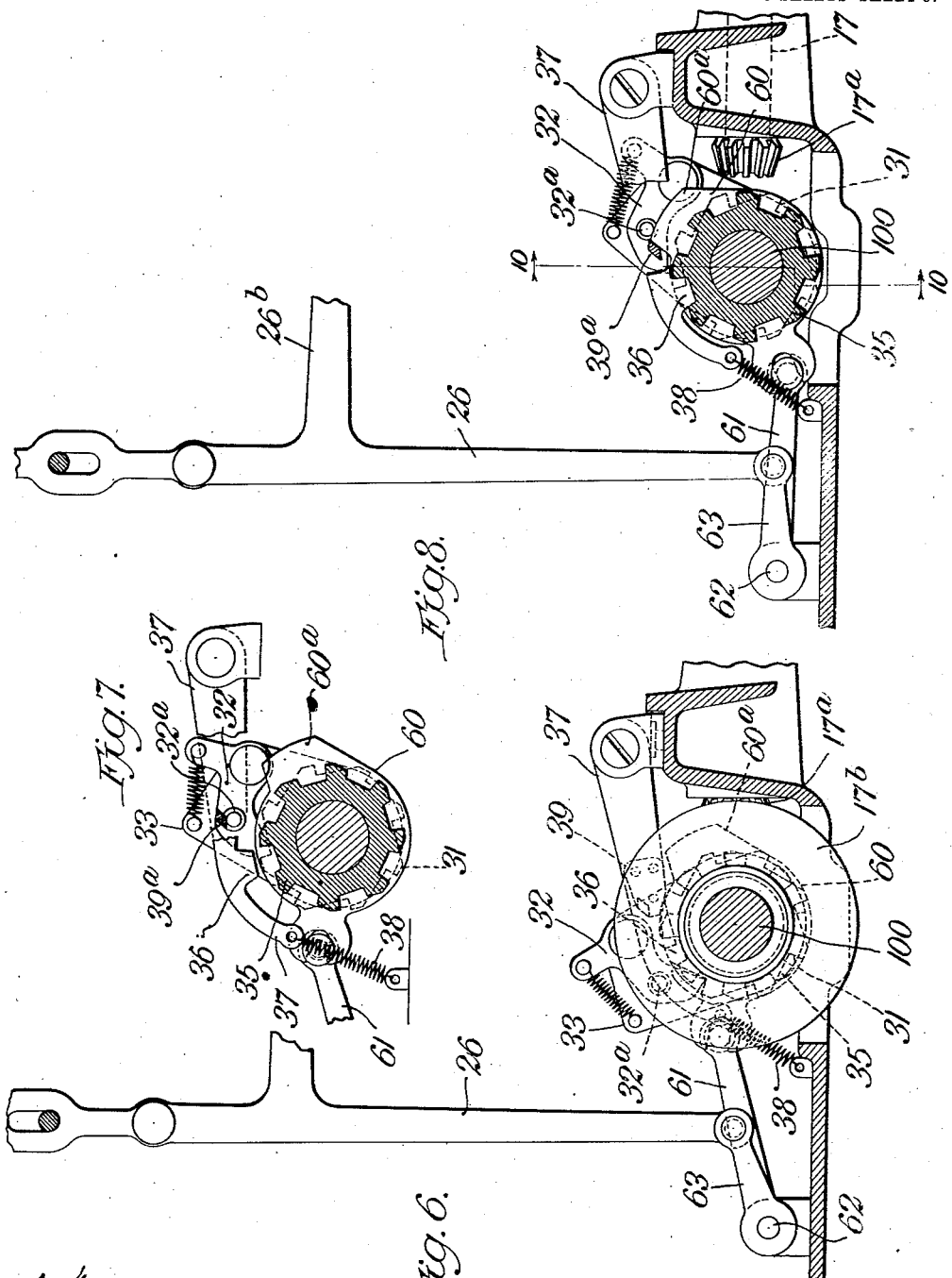

N. WHITE.
ADDING AND LISTING MACHINE.
APPLICATION FILED MAR. 5, 1910.
1,048,249.
Patented Dec. 24, 1912.
9 SHEETS—SHEET 6.
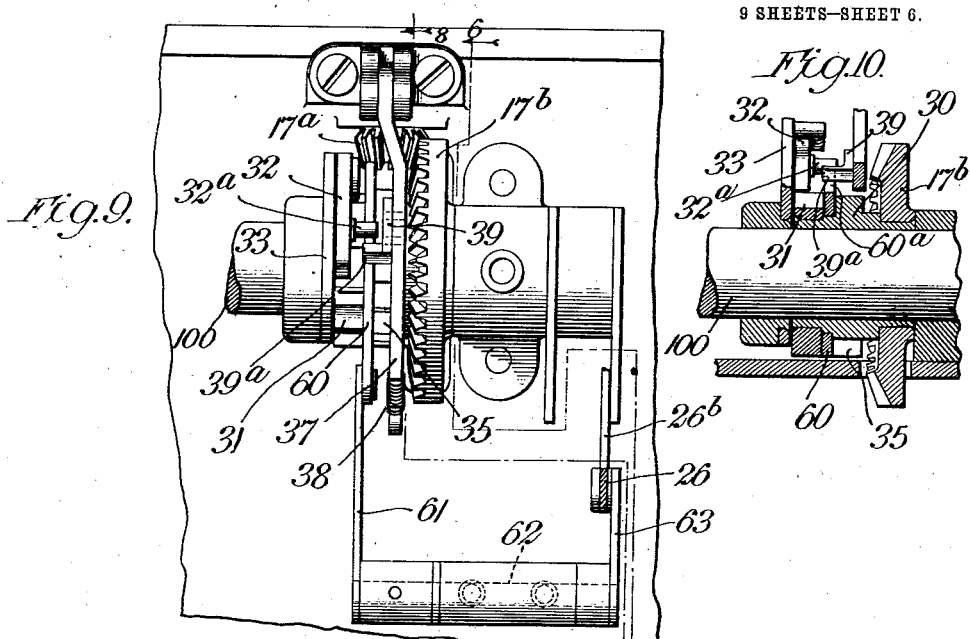
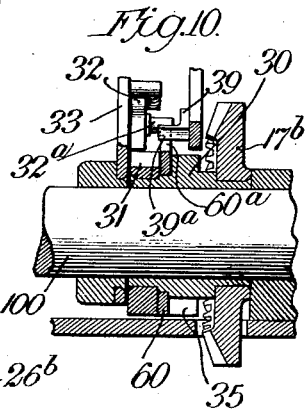
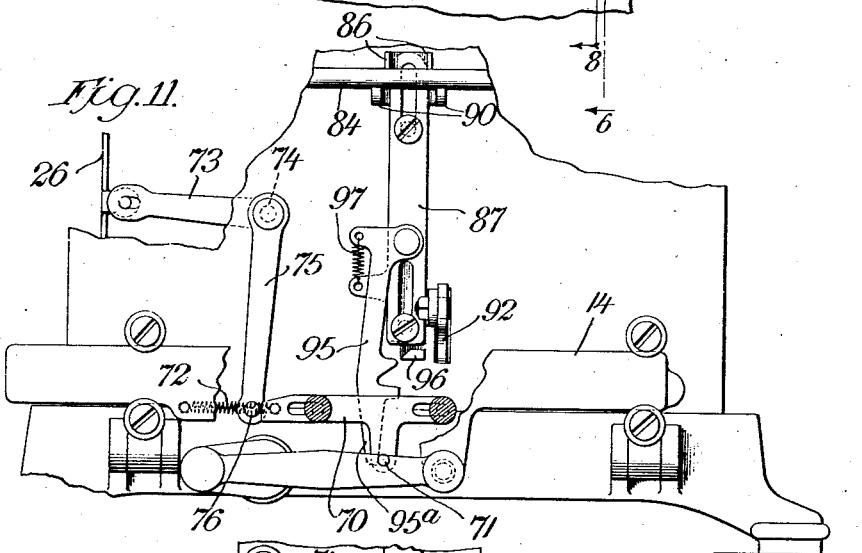
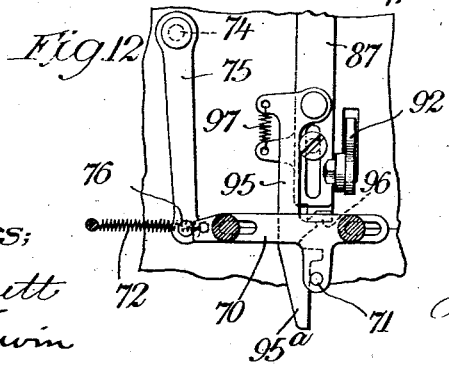

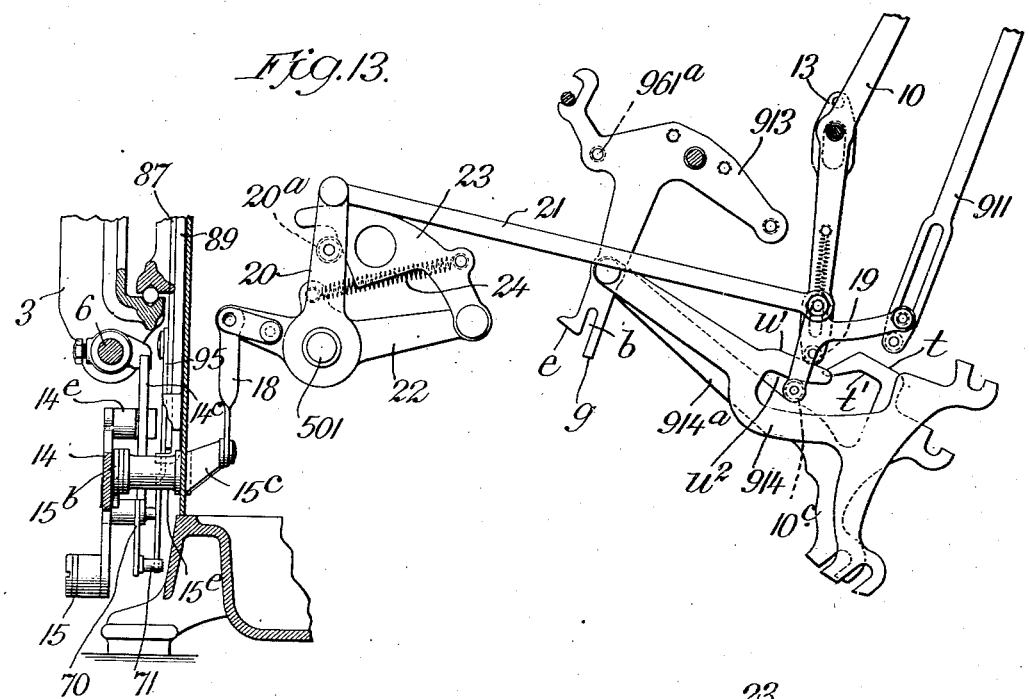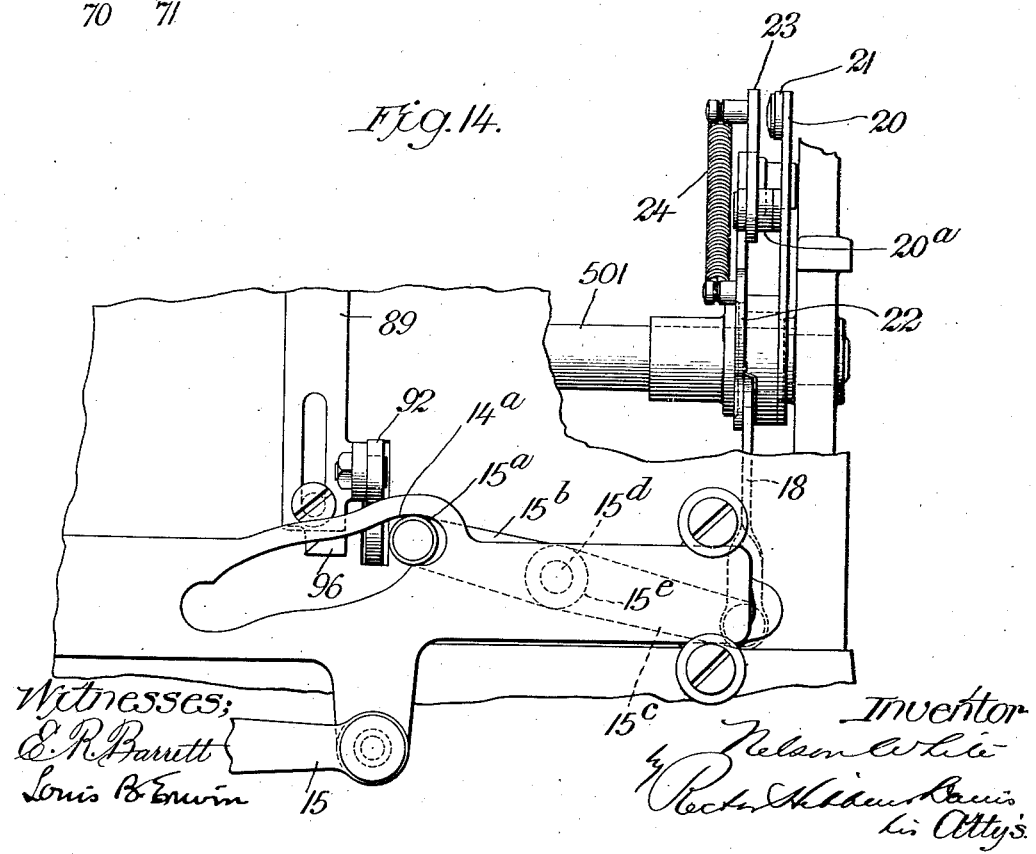

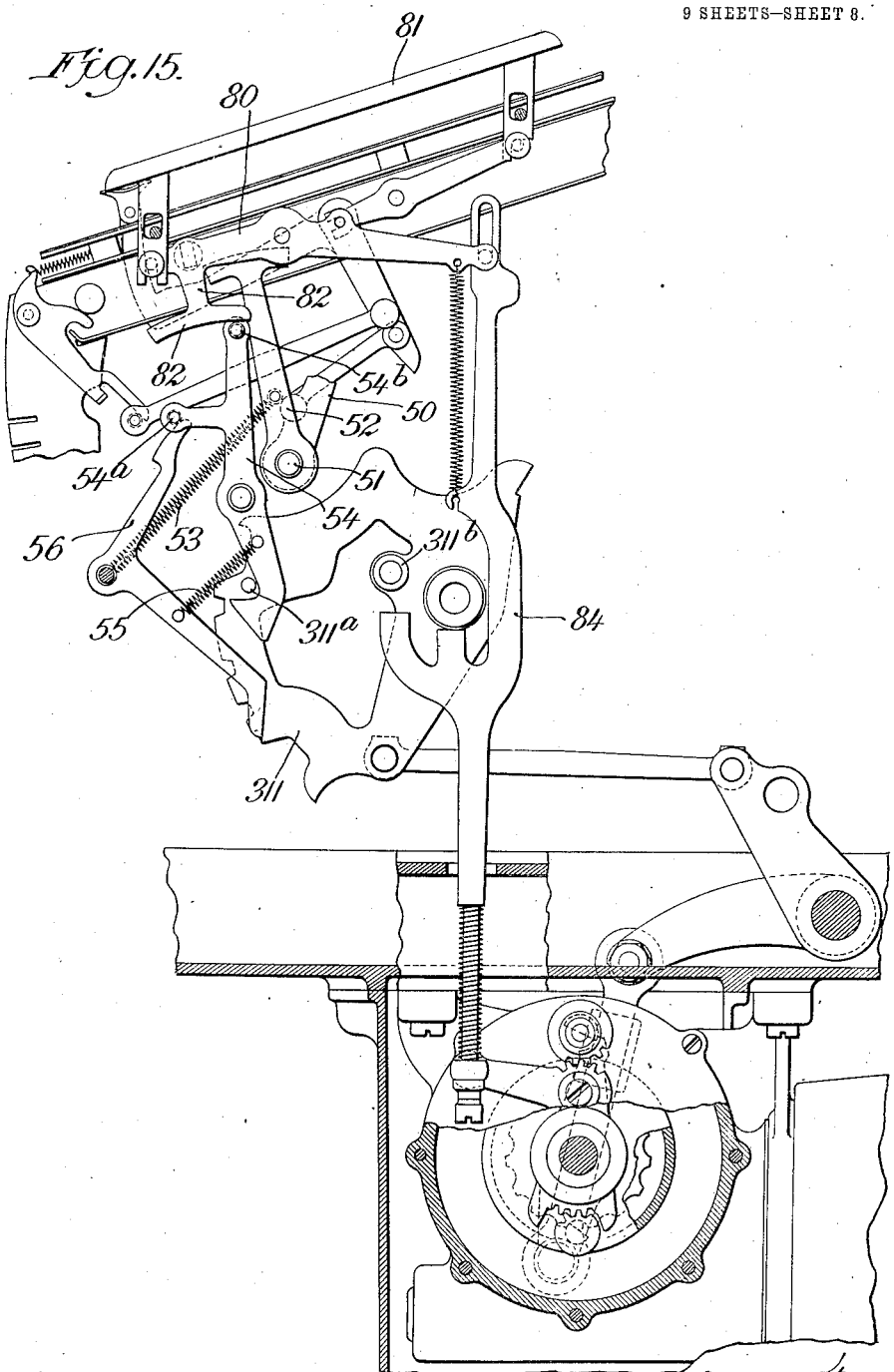

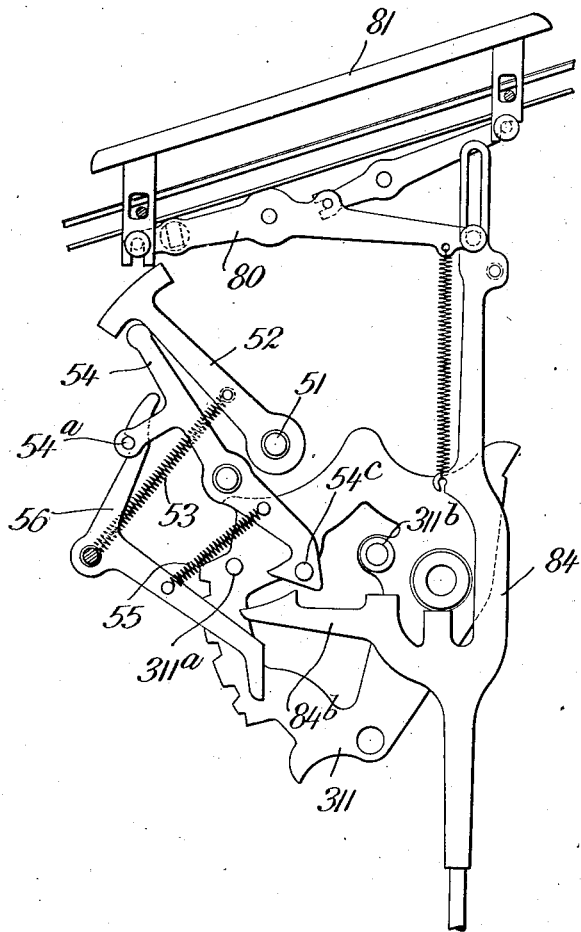

UNITED STATES PATENT OFFICE.

NELSON WHITE, OF DETROIT, MICHIGAN, ASSIGNOR TO BURROUGHS ADDING MACHINE COMPANY, OF DETROIT, MICHIGAN, A CORPORATION OF MICHIGAN.

ADDING AND LISTING MACHINE.

1,048,249.  Specification of Letters Patent.  Patented Dec. 24, 1912.

Application filed March 5, 1910. Serial No. 547,550.

*To all whom it may concern:*

Be it known that I, NELSON WHITE, a citizen of the United States, residing at Detroit, in the county of Wayne and State of Michigan, have invented certain new and useful Improvements in Adding and Listing Machines, of which the following is a specification.

The invention relates primarily to that type of adding and listing machine in which two counters or accumulators are employed with an arrangement whereby either may be used at will for adding a series of amounts, one being brought into play repeatedly to the exclusion of the other or amounts being alternately registered on the two accumulators; and with provisions whereby wheels of either accumulator may be turned backward to zero for the setting up of totals or subtotals, while the other accumulator remains inactive, and also whereby wheels of one accumulator may be so turned to zero and the other accumulator then brought into action for registration thereon of the total extracted from the first accumulator.

The invention also has to do with machines of such type in which the alternation in registration of amounts on the two accumulators may be caused to take place automatically and in which a paper carriage may be correspondingly shifted back and forth between two columnar positions.

One object of the invention is to provide effectively for preserving the proper relationship between accumulator actuators and wheels in the case of transferring a total from one accumulator to the other, such object being attained, when the actuators are in the form of reciprocating racks and the accumulator wheels in the form of pinions engageable with and disengageable from such racks, by arranging for full engagement with the racks of the pinions which are to receive the total, while the pinions which deliver the total are still fully engaged with the racks.

Another object of the invention is to prevent disturbance of the wheels of the accumulator from which totals have been transferred, by reason of engagement of such wheels with the actuators when the same are out of normal position as a result of the tripping of transfer or carrying devices due to successive registration of transferred totals upon the other set of wheels, which disturbance would take the form of erroneous backward turning of the first-mentioned set of wheels if the transfer total key should happen to be held down after a second total transferring operation had been performed and the machine again operated without releasing such key.

A further object of the invention is to provide simplified and more efficient means for effecting the automatic shift of controlling devices which determine which one of the counters is to be the primarily active one.

A still further object of the invention is to provide improved means for controlling the line spacing of paper in the laterally-shifting carriage so that where provision is made as heretofore for automatically disabling the line spacing mechanism when the carriage is in one of two columnar positions between which it is automatically moved back and forth and manipulative means are employed to reënable the line spacing mechanism when the carriage occupies that particular columnar position, the restoration of such manipulative means to normal will result in again disabling the line spacing mechanism.

The invention also aims to provide a simplified and more efficient form of means for controlling the carriage-reciprocating mechanism both as to positively locking the same against motion except as derived from the prime mover of the machine and as to the disabling of the mechanism when the carriage is to remain in one position during successive listing of amounts.

With these and incidental objects in view the invention consists in certain novel features of construction and combinations of parts, the essential elements of which are set forth in the appended claims and preferred forms of embodiment of which are described in detail hereinafter and fully illustrated in the accompanying drawings forming a part of this specification.

Of said drawings Figure 1 represents the machine in left side elevation without its inclosing casing and with side supporting frame-piece removed and a number of cross rods, shafts and studs in section as also the base casting and the carriage attachment at the rear; Fig. 2 is a similar right side elevation of the machine though here the carriage attachment also appears in elevation; Fig. 3 is a rear elevation of the machine; Fig. 4 is a view similar to Fig. 1 but not embracing so much of the machine and further differing from Fig. 1 in showing the transfer total key depressed and changed relationship of parts due thereto and resulting from a half cycle of operation of the machine; Fig. 5 is a detail sectional view of certain parts appearing in Fig. 4 but differently conditioned as compared therewith; Fig. 6 is a view similar to Fig. 2 but embracing only certain parts appearing at the lower right-hand portion thereof and including additional dotted line illustrations, the parts being at normal; Fig. 7 illustrates in vertical section from front to rear certain parts which appear in Fig. 6 though differently conditioned, as when an operation of the machine is in progress; Fig. 8 is a similar view illustrating a still different condition resulting from manipulation of devices for disabling the carriage reciprocating means; Fig. 9 is a plan view of parts shown in Fig. 6; Fig. 10 is a horizontal section of parts appearing in Fig. 9; Fig. 11 is a fragmentary rear elevation of the machine with the paper carriage omitted and some parts broken away and differing from Fig. 3 in showing the reverse position of carriage reciprocating devices and a corresponding difference in relationship of line spacing elements; Fig. 12 is a view similar to Fig. 11 though not including as many parts and further differing therefrom in illustrating the effect of manipulating devices which reënable the line spacing mechanism; Fig. 13 is a view similar to Fig. 1 though not including as many parts of the machine and further differing in showing the counter-controlling devices shifted; Fig. 14 is a rear elevation of parts shown in Fig. 13; Fig. 15 is an elevation similar to Fig. 2 but includes only parts shown at the upper left-hand portion of the latter and certain of those parts differently positioned; and Fig. 16 is a view similar to Fig. 15 illustrating a modification and showing the parts at normal in correspondence with Fig. 2.

Reference may be had to Patent No. 919,656, issued April 27, 1909, to Burroughs Adding Machine Company, on the joint invention of Jesse G. Vincent and myself, for many particulars of the duplex accumulator construction which is shown in the accompanying drawings, and reference may further be had to Patent No. 924,118, issued June 8, 1909, to Burroughs Adding Machine Company, on the joint invention of said Vincent and Russell E. Benner, for certain particulars of mechanism shown in the accompanying drawings for automatically reciprocating the paper carriage. In view of the disclosures in these said prior patents it will be unnecessary in the present specification to describe in detail all of the mechanism shown and its manner of operation although I shall have occasion to refer specifically to some of the features already known in making clear the manner of coöperation therewith of the novel features I have devised.

Depressible amount keys 291 control the racks 610 as usual and the two sets of pinions 916 and 916$^a$ are carried as heretofore in separate rock frames. Pitmen 914 and 914$^a$ control the rock frames respectively as heretofore and a lever 10 determines how this control shall be exerted, said lever being coupled to the total key link 911 as heretofore and carrying a spring slide 13 with a stud 19 to alternately engage raised edges $u'$ and $t$ of the pitmen. The lever 10 is here shown with a stud 10$^c$ at its lower end adapted to alternately pass below undercut portions $u^2$ and $t'$ of the pitmen,—being an equipment of the said lever and involving special formation of the pitmen not disclosed in said Vincent-White patent but at the same time not claimed herein. The transfer total key 265$^T$ operates as in the Vincent-White construction to lift the roller 19 out of contact with whichever pitman it may be engaging and also operates as therein explained to pull down the total key. The manner in which depression of this transfer total key causes one set of pinions to engage the racks during their descent and the other to engage during their ascent is fully set forth in said Vincent-White patent and need not be repeated here except to advert to the circumstance that according to the Vincent-White construction one set of pinions disengages from the racks while the other set of pinions is moved into engagement therewith.

Now referring to the first-stated object of the invention, which is to remove the possibility of racks and pinions getting out of proper relationship for engagement, the construction here shown provides for transfer of totals only from the upper to the lower set of pinions and not vice versa, and further provides for fully engaging the lower set of pinions with the racks before the upper set of pinions starts to disengage from the racks. Thus instead of having the upper pinions disengaged and the lower pinions engaged as the handle of the machine starts rearward, provision is made for engaging the lower pinions with the racks at the end of the forward stroke of the operating handle. This entails modification in the control of the pitmen. Thus while the pitman 914 is pivotally connected as usual to the depending arm of the three-armed rock lever 913, the other pitman 914$^a$ is not so connected but is pivoted to a separate rocker arm 913ª concentric with but capable of movement independent of said three-armed lever 913. An upper portion of said rocker arm 913ª and a depending portion thereof are formed with parallel slots $b$ and a sliding coupler-piece 913ᵇ is mounted upon the rocker arm 913ª through engagement of studs $c$ and $d$ with said slots respectively as shown in Figs. 1 and 4. The depending arm of the three-armed lever 913 is specially formed below the point of attachment of the pitman 914, being bifurcated and having a widened foot $e$ to the rear of the bifurcation $f$ and an elongated finger $g$ at the front side of said slot. Normally the stud $d$ seats in the upper end of the slot $f$ as shown in Fig. 1 so that the three-armed lever 913 and the rocker arm 913ª are connected to move as one. As a result of depression of the transfer total key 265ᵀ and an operation of the machine said stud is moved down out of said slot, thereby disconnecting said lever and arm so that the latter may move independently and it will be so moved by a stud $h$ on a branch of the familiar vibrating arm or lever 813 as the latter arrives at the end of its rearward swing which corresponds with the forward stroke of the operating handle, said stud $h$ acting against a shoulder $i$ of the coupler-slide 913ᵇ. The effect is to draw the lower pinions 916ª into engagement with the racks, assuming the lever 10 to be in a position which would cause the upper pinions to engage the racks during their descent, which condition is compelled as hereinafter explained. Therefore the lower pinions will be brought into full engagement with the racks while the upper pinions are still engaged therewith for the latter cannot be disengaged until the handle starts rearward and the wipe pawl 821 acts upon the stud 961ª in the usual manner to shift the three-armed lever 913 and thereby rock the upper pinion frame rearward at its lower end and forward at its upper end, the pitman 914 being then engaged with the lower stud of said frame as shown in Fig. 4. The means for effecting the disconnection of the lever 913 and arm 913ª and the interposition of the coupler shoulder $i$ into the path of the stud $h$, are of the following description: A lever suitably pivoted at its rear end to the frame-work as shown at $j$ has an upper forwardly-extending branch 913ᶜ with a bifurcated end embracing the stud $c$ of the coupler-piece 913ᵇ and said arm of the lever carries a stud $k$ in line with a foot formed upon a depending portion 265ª of the transfer total key stem 40 so that upon depression of said key the lever will be lowered. This lowering of the lever and consequent downward movement of the coupler-piece 913ᵇ is not sufficient, however, to move the stud $d$ out of the slot $f$ as of course this should not take place until that stage in the operation of the machine is reached where the lower pinions are to be engaged with the racks. The lever has a lower downwardly and forwardly-extending branch 913ᵈ which is formed with a beveled end edge $m$ normally above the line of travel of the stud $h$ but adapted through movement of the lever caused by depression of the transfer total key, to enter the path of movement of said stud. The result is that as the arm 813 swings rearward the stud rides upon said beveled edge and further lowers the lever, carrying the stud $d$ of the coupler-slide 913ᵇ out of the slot $f$, the stud $h$ then landing against the shoulder $i$ and moving the arm 913ª as before described and with the effect stated. The stud $d$ remains under the foot $e$ so that when the three-armed lever 913 is shifted as the handle starts rearward the slot $f$ will be again brought in line with said stud whereupon a spring 913ᵉ applied to the lever 913ᶜ—913ᵈ pulls the same up and restores the parts to normal.

As the above-described construction only provides for transfer of totals from the upper to the lower set of pinions means are provided for preventing depression of the transfer total key when the lever 10 is in a position which, under the arrangement shown in the Vincent-White patent, would cause a transfer from the lower to the upper set of pinions with the transfer total key depressed. Thus the upper end of the lever 10 is engaged with a sliding lock strip 40ª arranged between the two keyboard plates 212 and 213 and slotted to embrace the stem 40 of the transfer total key. This stem has a notch 40ᵇ which, when the lever 10 swings forward as to its upper end, is entered by a portion of the lock slide 40ª, as illustrated in Fig. 5, so that the key cannot be depressed with said lever 10 so adjusted.

Next referring to the second object stated, to-wit that of preventing disturbance of one set of pinions by reason of racks being out of normal as a result of transfer tripping by the other set of pinions, this object is attained by preventing successive operations of the machine with the transfer total key or the total or sub-total key held down between operations. At the conclusion of such a total transferring operation as above described the upper set of pinions will be out of mesh with the racks and if the transfer total key or other total key were left down and the handle again pulled these upper pinions would immediately move into engagement with the racks and should the latter have partaken of transfer movements as a result of addition of a transferred total to a registration already on the lower pinions, the dropping of the racks to or beyond normal would result in a backward turning of the upper pinions creating a false registration thereon. Therefore provision is made for compelling release of total keys between operations. The total key lever 227 is as usual linked to an arm 50 which is secured to a rock shaft 51 extending to the right-hand side of the machine and there carrying an arm 52 which is here shown drawn forward by a spring 53, (Fig. 2). This arm 52 in the present instance bears against the upper end of a latch lever 54 pivoted on cross shaft 904 and at its lower end shouldered to engage under a stud 311ª on the familiar full-stroke sector 311, the latch being beveled beyond said shoulder. A spring 55 tends to create such engagement but is inferior to the spring 53 or other springs which normally hold up the total key. In addition to the restraint imposed on the latch lever by engagement therewith of the said arm 52, it is normally engaged by a detent lever 56 whose upper arm is formed to engage behind a stud 54ª on a forward branch of the latch lever and whose downwardly-extending arm lies in the path of the stud 311ª with its upper edge on an inclination so that upon operation of the machine said stud wipes over such edge and displaces the detent lever against the stress of the spring 55 which connects it with the latch lever. If, in this operation, the arm 52 is rearward as a result of depression of a total key the release of the latch lever by the displacement of the detent lever in addition to the removal of restraint normally imposed upon the latch lever by the arm 52, results in the latch lever swinging forward as to its lower end so that upon the upward rocking of the full-stroke sector 311 to normal its stud 311ª will wipe over the inclined lower edge of the latch lever and the shoulder of the latter will then spring under said stud preventing another operation of the machine until the depressed total key has been released, (see Fig. 15). Of course upon the release of such depressed total key the arm 52 swings forward, forcing the latch lever back to normal or to the position shown in Fig. 2, whereupon the detent lever 56 becomes reëngaged with it.

In addition to the above-described locking of the full-stroke sector, which may be considered as part of a prime mover of the machine, provision is also made for locking the starting device employed when the machine is power-driven. In Figs. 2 and 15 I have illustrated an electric drive attachment such as disclosed in Patent No. 866,750, issued September 24, 1907, to Burroughs Adding Machine Company, on the invention of Jesse G. Vincent, with some modification in construction to provide for control by the latch lever 54. Thus the lever 80 which supports one end of the starting bar 81, is formed with a segmental foot 82 at the lower end of a pendent branch 83, the forward end of which foot stands normally just above and rearward of a stud 54ᵇ at the upper end of the said latch lever as shown in Fig. 2. The result is that when the latch lever moves to its effective position illustrated in Fig. 15 said stud 54ᵇ passes under said foot and prevents a second depression of the starting bar so long as the total key remains depressed. The vertical bar or link 84 is modified in construction by a shortening of the slot 84ª at the upper end thereof so that when said vertical bar or link is depressed by the roller stud 311ᵇ on the full-stroke sector 311 the starting bar lever 80 will be forcibly raised far enough to carry the foot 82 above the stud 54ᵇ so that the latter will be free to pass under the foot as the operation of the machine proceeds.

In Fig. 16 there is illustrated a modification of the construction last above described. Here the slot at the upper end of the vertical bar or link 84 is not shortened and so there is not the forcible return of the starting bar 81 and the latter is not itself locked but instead the bar or link 84 is locked. Thus the latter is formed with a forwardly-extending branch 84ᵇ with a raised portion at its forward extremity having a curved upper edge, and the lower end of the latch lever 54 has a laterally-projecting stud 54ᶜ. When the latch lever swings to effective position, such as illustrated in Fig. 15, this stud 54ᶜ moves over the raised portion of said branch of the bar or link 84, thereby locking the latter against the upward movement necessary for closing the clutch.

With either of the above-described constructions it will be obvious that the clutch of the electric drive cannot be closed immediately following an operation of the machine with a total key depressed if such key is held depressed and therefore power cannot be applied to operate the machine in such circumstances.

Referring now to the improved means for automatically effecting the shift of controlling devices for the two counters (see Figs. 1 and 13), the lower arm of the lever 10 is connected by a link 21 to an arm 20 loose upon a rock shaft 501. Mounted on this same rock shaft but movable independently of the arm 20 is a lever 22 having pivoted to its upwardly-extending arm a cam-piece 23 which is connected by a spring 24 to the hub of the lever. The acting portion of this cam takes the form of a downwardly-pointed V and engages a roller stud 20ª on the arm 20. The lever 22 is vibrated through suitable connections presently to be described and forces the cam back and forth over the roller stud 20ª so that the spring 24 will alternately act to cause said cam to shift the arm 20 in opposite directions, thereby changing the adjustment of the lever 10. The advantage of the particular arrangement shown is that throughout practically the entire swing of the lever 22 the adjustment of the controlling lever 10 remains unchanged and is in fact so held by the engagement of one side of the cam with the roller stud 20ª. Then when the said lever 22 is brought to the end of its stroke in one direction the point of the cam passes over the center of the said roller, whereupon the other side of the cam acts upon the latter under the stress of the spring 24 which has been stretched in the riding of the first side of the cam over the roller, and the result is that the arm 20 is then, but not until then, shifted in a quick and efficient manner.

The vibration of the lever 22 is produced through its connection with a reciprocating bar 14 at the back of the machine, which bar corresponds with the similarly-designated bar in the Vincent-Benner patent. It is here shown with a cam slot 14ª engaged by a roller 15ª on one arm 15ᵇ of a lever whose other arm 15ᶜ is connected by a link 18 with the lever 22. The arms 15ᵇ and 15ᶜ are here shown secured to opposite ends of a short shaft 15ᵈ journaled in a bearing 15ᵉ on the back panel of the machine.

As in the construction shown in the aforesaid Vincent-Benner patent the bar 14 is reciprocated by a link 15 connected to a crank 16 fastened on the rear end of a shaft 17, the forward end of said shaft carrying a bevel pinion 17ª in mesh with a crown bevel wheel 17ᵇ (Fig. 9), but as an improvement upon the construction shown in said patent I have devised the following described means for controlling the actuation of said gearing. The gear wheel 17ᵇ is secured to a sleeve 30 loose on the familiar oscillatory drive shaft 100 and there is secured to this same sleeve a ratchet wheel 31 adapted to be intermittently turned by a pawl 32 pivoted upon an arm 33 which is secured to said shaft 100, engagement between the pawl and the ratchet wheel being enforced by a spring 34, (see Figs. 6 to 8). Normally the arm 33 is forward and the pawl in engagement with a tooth of the ratchet wheel as shown by dotted lines in Fig. 6. When the operating handle of the machine is pulled or the machine otherwise operated to oscillate the shaft 100 in its initial direction the pawl is carried back a distance beyond the shoulder of the following tooth of the ratchet wheel and unless restrained from so doing comes to rest upon an intermediate portion of the inclined back of the next tooth ready to advance against the shoulder of the tooth ahead when the arm 33 rocks forward with the return oscillation of the shaft 100, such action causing the ratchet and connected gear wheel 17ᵇ to turn the proper distance for half rotating the crank 16 and thereby shifting the bar 14 from one extreme position to the other. It is desirable to lock the bar against movement except as derived from the shaft 100 and hence the sleeve 30 is formed or provided with a disk 35 having a series of notches with radial sides, as clearly shown in Figs. 7 and 8, and a correspondingly formed lug 36 on an arm 37 normally engages one of said notches to lock the sleeve and connected parts. Said arm 37 is pivoted at its rear end to a bracket on the base casting of the machine and is connected at its forward end to said base casting by a spring 38 for enforcing engagement between the lug 36 and the notch. Said arm has fastened to one side of it at an intermediate point a plate 39 (see dotted lines, Fig. 6,) having a laterally-projecting lug 39ª diamond-shaped in cross section, as shown in Figs. 7 and 8. The pawl 32 carries a laterally-projecting roller stud 32ª and when the pawl is retracted this stud rides up over said lug 39ª and takes a position on the rear side of the same so that when the pawl is advanced and before it reaches the shoulder of the ratchet tooth ahead the roller stud acting upon the oblique rear side of the lug with a camming effect will force the arm 37 up against the stress of the spring 38 so that the lug 36 will be carried out of the notch in the disk 35, (Fig. 7), thereby unlocking the latter and connected parts, whereupon they are free to be actuated as above explained through the turning of the ratchet wheel by the pawl. As the pawl reaches the end of its stroke another notch of the disk 35 arrives under the lug 36 and the latter snaps into it, the roller 32ª having of course passed on forward of the lug 39ª.

Means are provided for disabling at will the mechanism for reciprocating the bar 14, such means comprising a disk 60 loose upon the sleeve 30 and having a raised segmental portion 60ª normally retired from a position where the roller stud 32ª could reach it, but adapted upon rocking of the disk to be brought up against the lug 39ª, as shown in Fig. 8, so that its outer edge will constitute practically a continuation of the upper surface of the lug, from which it results that the roller stud having passed over said lug cannot drop behind it but will ride upon the high outer edge of the disk and so will be prevented from engaging the ratchet wheel when the arm 33 rocks forward. Consequently there will be no actuation of the bar-reciprocating mechanism and the same will remain locked by the arm 37. Means for controlling the disk 60 comprise an arm 61 having a stud engaging a bifurcated projection of the disk, said arm secured to one end of a rock shaft 62; an arm 63 secured to the other end of said rock shaft, (see Figs. 6, 8 and 9); and a key stem 26 connected at its lower end to the latter arm and carrying a key 25 at its upper end which protrudes through the keyboard. A spring 26ª normally upholds the key stem and the latter has a notch 26ᵇ to engage the upper keyboard plate when the key is depressed and hold the same down.

The reciprocating bar 14 is adapted to carry with it the paper carriage 3 through the same sort of connection as shown in the Vincent-Benner patent comprising a rod 6 on the carriage carrying adjustable fingers 7, any one of which may be engaged with the bar. The equipment of the latter for such engagement is somewhat modified as compared with that shown in the Vincent-Benner patent. Thus instead of having the upright portion notched for engagement of the finger 7 the bar carries a pair of pivotally-mounted arms 14ᵇ and 14ᶜ connected by a spring 14ᵈ, the arms extending on opposite sides of a limit stud 14ᵉ on the bar. This arrangement provides for a close engagement between the finger and the coacting members on the bar and also for a cushioning effect in reciprocations of the carriage.

Passing now to the matter of line spacing it may first be said by way of premise that in order to produce double column printing with successively recorded amounts in horizontal alinement it is essential that there shall be line spacing only in every other operation of the machine and the Vincent-Benner patent shows an arrangement for suspending the line spacing when the carriage moves to the right-hand position so that an amount having been printed in the left-hand column no line spacing ensues as the handle returns to normal. Similar mechanism is shown in the accompanying drawings, the same comprising slide bars or strips 87 and 89 mounted on the back panel of the machine, the former having jaws 86 embracing the line spacing bail 84 and the strip or bar 89 having jaws 90 extending under the bail rod. The feed lever 92 (Fig. 1) engages an ear of the slide bar or strip 89 as usual and the latter has a beveled lug 96 (Fig. 11) for engagement with the similar lug of a coupler piece or dog 95 pivoted to the slide strip or bar 87 and actuated by a spring 97. As in the case of the corresponding coupler piece or dog in the Vincent-Benner construction there is an undercut or shouldered downward extension 95ᵃ of the coupler piece against which a stud carried by the reciprocating bar 14 is adapted to act so as to disconnect the slides 87 and 89 when the carriage shifts to the right, which means a shift to the left of the bar 14 as viewed from the rear. However, according to the present invention such stud is not in fixed position on the bar 14 as in the Vincent-Benner construction but is otherwise arranged in the manner and for the purpose presently to be described.

Provision is made in the Vincent-Benner construction for discontinuing at will the automatic reciprocation of the paper carriage when it is desired to list only in a single column and for such work the carriage is required to be in the left-hand one of the two positions it is capable of occupying when the reciprocating mechanism is active. Now by the present invention provision is made for doing single column work with the carriage in the other or right-hand position also and to this end the means for disconnecting the paper feed slide bars or strips 87 and 89 by the shifting of the bar 14 which accompanies movement of the carriage to the right-hand position, may be disabled at will. This is the occasion for adopting a different arrangement than that of a stud such as that designated 14ᶠ in the Vincent-Benner construction fixed in position on the bar 14.

It is proposed by the present invention, besides providing for reënabling the line spacing mechanism of the carriage in the right-hand position, to provide for again disabling the same should the means by which the reënabling has been accomplished be released or restored to normal. On the bar 14 there is mounted a longitudinally-movable slide piece 70, through slots formed in it and studs on the bar, and this slide piece has a depending portion with a stud 71 adapted to perform the function of the stud 14ᶠ in the Vincent-Benner construction, that is to say the function of disabling the line spacing mechanism when the carriage moves to the right, by operating upon the depending portion 95ᵃ of the coupler or dog 95 as illustrated in Fig. 11. The slide is connected to the bar by a spring 72 which is superior to the spring 97 so that this slide does not change its position on the bar when its stud 71 strikes the coupler 95. However, the slide is designed to be moved back against the stress of its spring 72 whenever the operator desires to reënable the line spacing mechanism with the carriage in the right-hand position. The before-mentioned key 25 serves the purpose, its stem 26 having a rearward extension 26ᵇ coupled to an arm 73 which is secured to a short shaft 74 in a bearing on the back panel of the machine, another arm 75 being secured to the rear end of said shaft and having a stud 76 at its lower end to act upon the slide 70. With the carriage in the left-hand position the slide is some distance away from the stud 76, as illustrated in Fig. 3, but with the carriage moved to the right, that is to say with the bar 14 moved to the left as viewed from the rear, the end of the slide lies up close to said stud, as illustrated in Fig. 11. It is obvious therefore that depression of the key 25 will result in thrusting said slide to the right as the parts are viewed from the rear, thereby permitting the coupler or dog 95 to regain its position in operative relation to the lug 96 of the line spacing bar 89, as illustrated in Fig. 12. The stud 71, however, remains in engagement with the vertical edge of the coupler 95 so that if the operator, after depressing the key 25 to reënable the line spacing, should change his mind and release said key the mechanism would be restored to just the condition it was in before he depressed the key, that is the slide 70 would resume its former position, disabling the coupler 95. Hence, notwithstanding the operator may have depressed the key he can resume double-column work without having disturbed the line spacing. Of course if, having depressed the key, the coupler 95 was not displaced by release of the key, line spacing would occur with the carriage in the right-hand position, which would result in leaving a space where there should be an item in the left-hand column and the two imprints successively made, first with the carriage in the right-hand position and then with the carriage in the left-hand position, would not be in horizontal alinement as they should be.

What I claim is:

1. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; optionally operable means for causing the pinions to remain engaged with the racks during movement thereof the first-mentioned way for reverse rotation to extract a total; a prime mover; and means for disabling the same for successive operations while the last-mentioned means is held operated.

2. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; and means for disabling the same for successive operations while the said key is kept depressed.

3. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; optionally operable means for causing the pinions to remain engaged with the racks during movement thereof the first mentioned way for reverse rotation to extract a total; a prime mover; and a normally restrained lock for preventing operation thereof controlled by said optionally operable means and released by an operation of the prime mover with said means operated.

4. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; and a normally restrained lock for preventing operation thereof controlled by said key and released by an operation of the prime mover with the key depressed.

5. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; and a spring-drawn latch and latch-detent, the former normally restrained by the key connections and the detent and the latter adapted to be displaced by the prime mover and the latch adapted to then engage the same as long as the key remains depressed.

6. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; an oscillatory prime mover having a stud; a pivoted latch adapted to engage the latter to prevent initial rocking of the prime mover, said latch normally held out of the path of the stud through engagement with the aforesaid key connections; and a pivoted detent normally engaging said latch to also restrain it; said detent and latch being spring-actuated in opposite directions; and the stud on the prime mover adapted in return movement of the latter to wipe past the catch-shoulder of the latch.

7. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; optionally operable means for causing the pinions to remain engaged with the racks during movement thereof the first-mentioned way for reverse rotation to extract a total; a prime mover; a power drive applied thereto, through the medium of a clutch; a clutch-closer; and a lock for the latter taking effect upon operation of the prime mover with the aforesaid optionally operative means operated and until the latter have been released.

8. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; a power drive applied thereto, through the medium of a clutch; a clutch-closer; and a lock for the latter normally restrained by the aforesaid key connections; and a detent also normally restraining the lock and adapted to be disabled by the prime mover.

9. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; optionally operable means for causing the pinions to remain engaged with the racks during movement thereof the first-mentioned way for reverse rotation to extract a total; a prime mover; a power drive applied thereto, through the medium of a clutch; a clutch-closer; and a lock for the latter taking effect upon operation of the prime mover with the aforesaid optionally operative means operated and until the latter have been released, said lock also adapted to engage the prime mover and prevent movement thereof otherwise than by the power drive.

10. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; a power drive applied thereto, through the medium of a clutch; a clutch-driver; and a lock for the latter normally restrained by the aforesaid key connections and adapted when fully released to engage the prime mover and prevent movement thereof otherwise than by the power drive; and a detent normally restraining the lock and adapted to be disabled by the prime mover.

11. In a machine of the character described, the combination of racks; adding pinions; means for reciprocating said racks; means for varying the extent of movement thereof; means for causing the pinions to be disengaged from the racks during movement of the latter one way and engaged therewith during movement of the racks the other way to effect adding on the pinions; a depressible key and connections for causing the pinions to remain engaged with the racks during movement thereof the first-mentioned way for reverse rotation to extract a total; a prime mover; a power drive applied thereto, through the medium of a clutch; clutch-closing means including a shiftable bar; a latch tending to engage the prime mover to prevent initial movement thereof and tending to block the said bar but normally restrained by the aforesaid key connections; and a detent normally restraining the latch and adapted to be disabled by the prime mover.

12. In a machine of the character described, the combination with duplex registering mechanism, of a controlling lever, means for oscillating the same, a pivoted arm having a stud, and a spring-drawn double-acting cam-arm engaging the said stud and pivotally mounted on the said lever.

13. In a machine of the character described, the combination of differential actuators; two sets of adding wheels separately operable thereby; means controlling coöperative relationship of wheels and actuators; a shiftable controlling member for said means, and mechanism for automatically shifting said member comprising a shiftable double-acting spring-drawn cam and means for shifting the same.

14. In a machine of the character described, the combination of differential actuators; two sets of adding wheels separately operable thereby; means controlling coöperative relationship of wheels and actuators; a shiftable controlling member for said means, and mechanism for automatically shifting said member comprising a lever, means for oscillating the same, a pivoted arm having a stud, a spring-drawn double-acting cam-arm engaging the said stud and pivotally mounted on the said lever, and a connection between the said arm and the aforesaid controlling member.

15. In a machine of the character described, the combination of differential actuators; two sets of adding wheels separately operable thereby; means controlling coöperative relationship of wheels and actuators; a shiftable controlling member for said means, and mechanism for automatically shifting said member comprising a pivoted arm linked to the latter and having a stud, a lever carrying a pivoted double-acting spring-drawn cam-arm engaging said stud, a reciprocating bar having a cam-slot, and a lever engaged with the latter and linked to the first-mentioned lever.

16. In a machine of the character described, the combination of a set of racks, means for differentially reciprocating the same, two sets of wheels independently operable by the racks, type carriers common to said sets of wheels, printing mechanism, a laterally shiftable paper carriage, line spacing mechanism, and means for automatically shifting said carriage back and forth between two columnar positions and coincidently automatically alternating coöperative relationship between the racks and the two sets of wheels, and alternating effectiveness and ineffectiveness of the line spacing mechanism, with provisions for disabling said carriage shifting means at will to permit single column printing with the carriage in either of its two positions and for maintaining the line spacing mechanism effective under either condition; also with provisions for disabling the line-spacing mechanism upon release of the carriage-shift disabling means when the carriage is positioned where normally the line spacing mechanism is ineffective.

17. In a machine of the character described, the combination of a set of racks, means for differentially reciprocating the same two sets of wheels independently operable by the racks, type carriers common to said sets of wheels, printing mechanism, a laterally shiftable paper carriage, line spacing mechanism, means for automatically shifting said carriage back and forth between two columnar positions and coincidently automatically alternating coöperative relationship between the racks and the two sets of wheels, means for correspondingly alternating effectiveness and ineffectiveness of the line-spacing mechanism, manipulative means for disabling the carriage-shifting means with the carriage in either shifted position, and means operated by said manipulative means for rendering the line-spacing mechanism effective when the carriage is positioned where normally said mechanism is ineffective, with provisions for again rendering the same ineffective upon release of the manipulating means.

18. In a machine of the character described, the combination of reciprocating racks; two sets of pinions separately engageable therewith; means for keeping one set of pinions engaged with the racks during movement thereof in one direction and disengaged from the racks during movement thereof in the opposite direction for purposes of addition; means for reversing the order of engagement and disengagement of racks and said set of pinions for total extracting purposes; and means for positively moving the other set of pinions into mesh with the racks before disengagement therefrom of the first set is under way; substantially as and for the purpose described.

19. In a machine of the character described, the combination of reciprocating racks; two sets of pinions separately engageable therewith; means for keeping one set of pinions disengaged from the racks during advance movement thereof and engaged during return movement of the racks; means for reversing this order by keeping said pinions engaged with the racks during their advance and disengaged during return; and means for positively moving the other set of pinions into engagement with the racks after the same have been advanced in engagement with the first set of pinions and before disengagement of the latter from the racks is under way.

20. In a machine of the character described, the combination of a reciprocatory prime mover; reciprocatory racks; two sets of pinions separately engageable therewith; means for engaging one set of pinions with the racks after advance thereof and at the beginning of a return stroke of the prime mover, with provisions for at will causing the said set of pinions to be in engagement with the racks during advance thereof and disengaged at the beginning of a return stroke of the prime mover; and means for engaging the other set of pinions with the racks at the end of the initial stroke of said prime mover while the first set remains engaged with the racks.

21. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler normally holding said rockers together; a vibrating arm with a pawl to shift one rocker first one way and then the other at the beginnings of movement of said arm in opposite directions, the arm being equipped to act upon the other rocker when the latter is uncoupled from its mate; and a key and connections for changing the adjustment of the pitmen to cause one set of pinions to engage the racks during their advance and the other set to engage the racks during their return, said key adapted to displace the aforesaid coupler.

22. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler normally holding said rockers together, a vibrating arm with a pawl to shift one rocker first one way and then the other at the beginnings of movement of said arm in opposite directions, the arm being equipped to shift the coupler and to act upon the other rocker when the latter is uncoupled from its mate; and a key and connections for changing the adjustment of the pitmen to cause one set of pinions to engage the racks during their advance and the other set to engage the racks during their return, said key adapted to displace the aforesaid coupler to establish coöperative relationship between it and the aforesaid vibrating arm.

23. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler normally holding said rockers together; an operating lever engaged with said coupler; a vibrating arm with a pawl to shift one rocker first one way and then the other at the beginnings of movement of the arm in opposite directions, said arm adapted to act upon said coupler-operating lever and thereafter to shift the other rocker; and a key and connections for changing the adjustment of the pitmen and bringing the coupler-operating lever into coöperative relationship with the vibrating arm.

24. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler carried by one rocker and normally engaging the other; an operating lever engaged with said coupler; a vibrating arm with a pawl to shift one rocker first one way and then the other at the beginnings of movement of the arm in opposite directions, said arm adapted to act upon said coupler-operating lever and thereafter to shift the other rocker by acting against the coupler; and a key and connections for changing the adjustment of the pitmen and bringing the coupler-operating lever into coöperative relationship with the vibrating arm.

25. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler normally holding said rockers together; a vibrating arm with a pawl to shift one rocker first one way and then the other at the beginnings of movement of said arm in opposite directions, the arm being equipped to act upon the other rocker when the latter is uncoupled from its mate; a key and connections for changing the adjustment of the pitmen to cause one set of pinions to engage the racks during their advance and the other set to engage the racks during their return, said key adapted to displace the aforesaid coupler; and means for preventing operation of said key when the pitmen are adjusted for a reverse order of engagement of the two sets of pinions with the racks.

26. In a machine of the character described, the combination of reciprocating racks; rock frames; a set of pinions in each rock frame; pitmen for the rock frames respectively engageable therewith on one side or the other of the rocking center; rockers jointed to the pitmen respectively; a coupler normally holding said rockers together; a vibrating arm with a pawl to shift one rocker first one way and then the other at the beginnings of movement of said arm in opposite directions, the arm being equipped to act upon the other rocker when the latter is uncoupled from its mate; a controlling member for changing the adjustment of the pitmen to provide for one or the other set of pinions coöperating with the racks; a key and connections for modifying the adjustment of pitmen as established by one position of said controlling member to cause one set of pinions to engage the racks during their advance and the other set of pinions to engage the racks during the return thereof, said key adapted to displace the coupler; and a lock to prevent operation of the key when the controlling member is in its other position.

27. In a machine of the character described, the combination of a rock shaft; an arm secured thereto and carrying a pawl with a stud; a ratchet wheel loose on the shaft; a locking disk fast with the ratchet wheel; and a lever engaging the disk and having a cam-projection in the path of the pawl stud.

28. In a machine of the character described, the combination of a rock shaft, an arm secured thereto and carrying a pawl with a stud; a ratchet wheel loose on the shaft; a locking disk fast with the ratchet wheel; and a lever engaging the disk and having a cam-projection in the path of the pawl stud, the latter adapted to ride over the projection under one direction of movement and to ride under the same, disengaging the lever from the locking disk, when the pawl carrier moves in the opposite direction.

29. In a machine of the character described, the combination of a rock shaft, an arm secured thereto and carrying a pawl with a stud; a ratchet wheel loose on the shaft; a locking disk fast with the ratchet wheel; a lever engaging the disk and having a cam-projection in the path of the pawl stud, the latter adapted to ride over the projection under one direction of movement and to ride under the same, disengaging the lever from the locking disk, when the pawl carrier moves in the opposite direction; a loosely-mounted disk having a portion adapted to form practically a continuation of the high side of the cam-projection and receive the pawl stud to prevent the pawl engaging the ratchet-wheel; and manipulative means controlling said loose disk.

30. In a machine of the character described, the combination of a rock shaft, an arm secured thereto and carrying a pawl with a stud; a ratchet wheel loose on the shaft; a locking disk fast with the ratchet wheel; a lever engaging the disk and having a cam-projection in the path of the pawl stud, the latter adapted to ride over the projection under one direction of movement and to ride under the same, disengaging the lever from the locking disk, when the pawl carrier moves in the opposite direction; a loosely-mounted disk having a portion adapted to form practically a continuation of the high side of the cam-projection and receive the pawl stud to prevent the pawl engaging the ratchet-wheel; and a key and connections for shifting said loose disk.

NELSON WHITE.

Witnesses:
R. S. MIELERT,
J. G. VINCENT.